US012609950B2

(12) United States Patent
Parsacala et al.

(10) Patent No.: US 12,609,950 B2
(45) Date of Patent: Apr. 21, 2026

(54) TEMPORAL PROFILE GRAPH FOR CYBER BEHAVIORS (TPG)

(71) Applicant: TRUEFORT, INC., Weehawken, NJ (US)

(72) Inventors: Nazario Parsacala, Weehawken, NJ (US); Sameer Malhotra, Weehawken, NJ (US)

(73) Assignee: TRUEFORT, INC., Weehawken, NJ (US)

( * ) Notice: Subject to any disclaimer, the term of this patent is extended or adjusted under 35 U.S.C. 154(b) by 74 days.

(21) Appl. No.: 18/434,843

(22) Filed: Feb. 7, 2024

(65) Prior Publication Data

US 2025/0254188 A1    Aug. 7, 2025

Related U.S. Application Data

(60) Provisional application No. 63/431,050, filed on Dec. 8, 2022.

(51) Int. Cl.
*G06F 21/00*      (2013.01)
*H04L 9/40*      (2022.01)

(52) U.S. Cl.
CPC ................................ *H04L 63/1425* (2013.01)

(58) Field of Classification Search
CPC .................................................. H04L 63/1425
See application file for complete search history.

(56) References Cited

U.S. PATENT DOCUMENTS

| | | | | |
|---|---|---|---|---|
| 11,157,267 B1* | 10/2021 | Li | ............................. | G06F 8/70 |
| 2012/0137367 A1* | 5/2012 | Dupont | .................. | G06F 21/00 |
| | | | | 726/25 |
| 2018/0183818 A1* | 6/2018 | Malhotra | ............ | H04L 63/1425 |
| 2018/0332072 A1* | 11/2018 | Ford | ..................... | H04L 9/3236 |
| 2020/0104775 A1* | 4/2020 | Chintalapati | .... | G06Q 10/06393 |

* cited by examiner

*Primary Examiner* — Michael M Lee
(74) *Attorney, Agent, or Firm* — JUNEAU & MITCHELL; Todd L. Juneau

(57)         ABSTRACT

The invention relates to computer security, and specifically to a method and system for creating and storing a time-based graph of all application behaviors in an enterprise or organization. For example, according to one aspect, multiple application behavioral metric definitions are expressed for expected application interactions and state on a temporal basis, these metrics are each part of a behavior that needs to be evaluated individually or in combination with other metrics. At least some of the behavioral metrics are expressed based on an association with an application profile or common entity. The Temporal Profile Graph make associating and lookup of application behaviors efficient and cheap on compute and memory requirements. The graph node relationship is built using a time-based key that enables quick association of all application behavior metrics to a specific period in time within the enterprise or organization operating environment.

1 Claim, 3 Drawing Sheets

Temporal Profile Graph: application behaviors

EdgeKey1 = function(SDK,APPSERVER, 0 0 0 ? * SAT *)
EdgeKey2 = function(SDK,APPSERVER, 0 0 0 ? * SUN *)

10 Nodes vs 16 Nodes !!

Temporal Profile Graph: Example Schema

Temporal Profile Graph: application behaviors

FIG. 3

Temporal Profile Graph: Example attributes

Application : SDK
Role        : APPSERVER

| Schedule   | : 0 0 0 ? * SAT * |
| Command    | : vi |
| Arguments  | : vi /tmp/* |
| User       | : root |
| Executable | : /usr/bin/vi |
| Md5sum     | : 332585ce5a4ad83b1c77c61b8e825ba0 |
| Memory     | : Min: 1028 Max: 1500 |
| CPU        | : Min: 0 Max: 10 |

| Schedule   | : 0 0 0 ? * MON * |
| Command    | : vi |
| Arguments  | : vi /etc/password |
| User       | : bushido |
| Executable | : /usr/bin/vi |
| Md5sum     | : 332585ce5a4ad83b1c77c61b8e825ba0 |
| Memory     | : Min: 1200 Max: 2458 |
| CPU        | : Min: 0 Max: 10 |

TEMPORAL PROFILE GRAPH FOR CYBER BEHAVIORS (TPG)

BACKGROUND

The invention relates to computer security, and specifically to a method and system for creating and storing a time-based graph of all application behaviors in an enterprise or organization.

Enterprise data breach or malicious attack on application services are an exponentially increasing problem. Traditional defense mechanisms using just malware detection, virus detection or perimeter fencing with firewalls are no longer adequate. Threat actors are becoming more motivated, sophisticated, and attack surface has increased due to influx of BYOD and IOT. Most data breaches are accomplished via internal compromises from either rogue employees, compromised networks or social engineering.

Effective measures are therefore needed to define, create, and store application behaviors in a system that can easily help associate, lookup and map such behaviors in a temporal fashion.

SUMMARY

The inventive disclosure provides a method and system for creating and storing a time-based graph of all application behaviors in an enterprise or organization.

The invention provides a complete Temporal Profile Graph for application cyber behaviors, modeling and expression for a cyber defense system based upon monitoring application behavior and comparing to the expected temporal behavior. The system is designed with modularity in mind to accommodate flexible configuration. However, the complete ecosystem of these components inter-operating seamlessly is the key to this invention.

For example, according to one aspect, multiple application behavioral metric definitions are expressed for expected application interactions and state on a temporal basis, these metrics are each part of a behavior that needs to be evaluated individually or in combination with other metrics. At least some of the behavioral metrics are expressed based on an association with an application profile or common entity. The Temporal Profile Graph make associating and lookup of application behaviors efficient and cheap on compute and memory requirements. The graph node relationship is built using a time-based key that enables quick association of all application behavior metrics to a specific period in time within the enterprise or organization operating environment, including metrics for specific CPU process behavior, specific User name behavior, specific password behavior, specific application root behavior, specific file storage location behavior, specific Md5sum file size behavior, and specific memory behavior.

BRIEF DESCRIPTION OF THE DRAWINGS

FIG. 3 is a schematic diagram and depicts the application behavior metrics attributes to be stored in a Temporal Profile Graph.

DETAILED DESCRIPTION OF THE INVENTION

Figure 1:
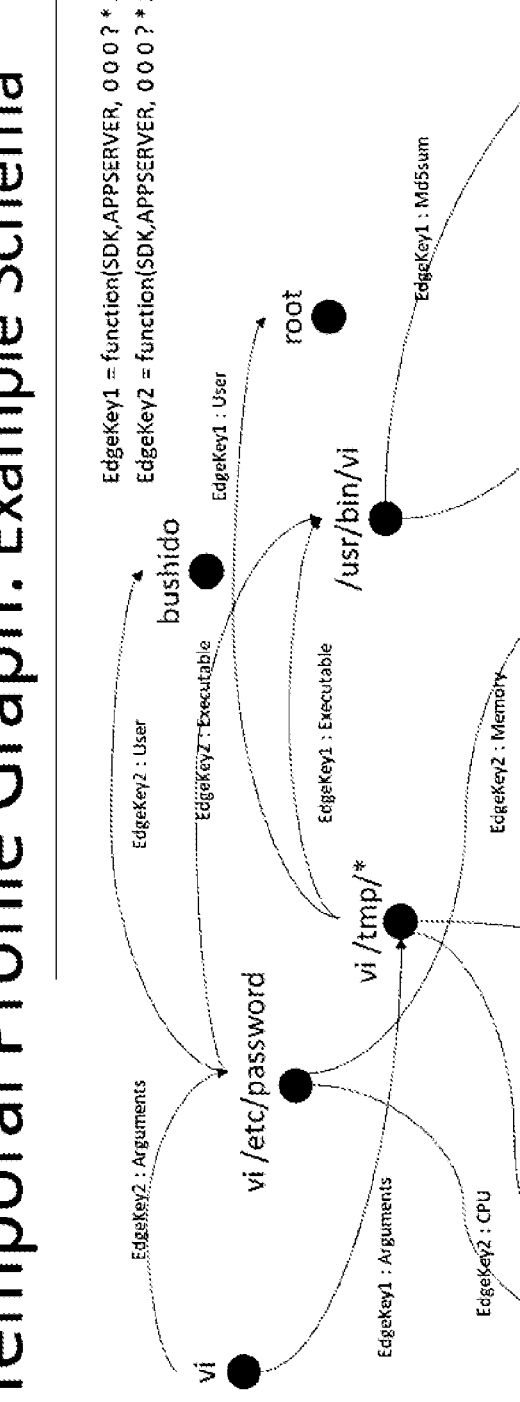
FIG. 1 is a schematic diagram and depicts an illustrative model of how Application behaviors are created and defined in a Temporal Profile Graph.

Embodiments disclosed and described herein are directed to a system, comprising:

a security platform having programming instructions executable on a processor configured to effect, by the security platform in operative communication with one or more client computer networks, an Anomaly Detection Engine (module) configured to compare real-time telemetry with a learned or defined application profile, wherein the real-time telemetry is a streaming data feed of application behavioral metrics from native agents, cloud workloads, third party agents, and agentless telemetry;

a Temporal Application Behavior Metric module in operative communication with the Anomaly Detection Engine, wherein the Temporal Application Behavior Metric module configured to evaluate multiple application behavioral metrics expressed in application interactions and application state, on a temporal basis, wherein said application behavioral metrics are evaluated individually or in combination with other metrics, wherein at least some of the application behavioral metrics include but are not limited to: metrics expressed based on an association with an application profile or common entity, CPU metrics, User name metrics, password metrics, application root metrics, file storage location metrics, Md5sum file size metrics, memory metrics, process metrics, identity metrics, network metrics, login metrics, packages metrics, and file activity metrics;

a Temporal Profile Graph (TPG) module in operative communication with the Temporal Application Behavior Metric module, wherein the Temporal Profile Graph module configured to perform associating and lookup of application behavioral metrics using minimal compute and memory requirements, the Temporal Profile Graph module configured to build a graph node relationship using a time-based key to enable quick association of all application behavior metrics to a specific period in time within an enterprise or organization operating environment;

an Anomaly Event/Alert module in operative communication with the Anomaly Detection Engine, the Anomaly Event/Alert module configured to report any deviation of application behavioral metrics, as detected by the Anomaly Detection Engine, as an alert;

a Metrics Persistence module configured to perform application behavioral metrics learning by consuming the real-time telemetry from various sources and persisting in a Database (DB);

an Application Behavioral Metrics Learning Engine (module) configured to read persisted telemetries within a specified time range, wherein the Application Behavioral Metrics Learning Engine places the telemetries in the application role context of the workload source, wherein the telemetries are also compiled in time buckets, wherein the Application Behavioral Metrics Learning Engine uses a customized syntactic pattern recognition approach to compile workload telemetries into application behavioral metrics profiles, wherein the Application Behavioral Metrics Engine stores application behavioral metrics in an Temporal Profile Graph (TPG) format, wherein the TPG format is configured to be user readable and editable;

a Manual Temporal Profile Graph (MTPG) module configured to permit manual definition of temporal application behavioral metrics, and editing of learned behavior, the MTPG module is operatively connected to the Temporal Application Behavioral Metrics module, which stores manually defined temporal application behavior metrics in the Temporal Profile Graph (TPG);

wherein the Temporal Profile Graph (TPG) format permits the TPG to be treated as code, wherein evaluation of temporal application behavior metrics is part of an iterative process, where temporal application behavioral metrics can be updated, and wherein the the TPG format is part of the QA/test process to check for temporal application behavioral metrics deviation;

a Merger module configured to take alerts and merge them to an temporal application behavioral metrics definition as a mechanism for fine tuning the TPG and increasing sensitivity of the alert;

wherein the Temporal Profile Graph (TPG) is created by using a Telemetry Database used for storing the telemetries, the Application Behavioral Metrics Learning Engine is configured to receive telemetries stored in the Telemetry Database, wherein an application function/module places the telemetry in the application context, wherein a role function/module aggregates the telemetries in the role for the workload source for that application, wherein a profile type function/module groups the telemetries in time buckets, wherein a schedule function/module groups the telemetries with the schedule on the time bucket, and wherein these functions are then added as telemetry attributes to the TPG.

Embodiments described herein are also directed to a method, comprising the steps:

In a security platform having programming instructions executable on a processor configured to effect, by the security platform in operative communication with one or more client computer networks, comparing real-time telemetry with a learned or defined application profile in an Anomaly Detection Engine (module), wherein the real-time telemetry is a streaming data feed of application behavioral metrics from native agents, cloud workloads, third party agents, and agentless telemetry;

evaluating multiple application behavioral metrics expressed in application interactions and application state, on a temporal basis, using a Temporal Application Behavior Metric module in operative communication with the Anomaly Detection Engine, wherein said application behavioral metrics are evaluated individually or in combination with other metrics, wherein at least some of the application behavioral metrics include but are not limited to: metrics expressed based on an association with an application profile or common entity, CPU metrics, User name metrics, password metrics, application root metrics, file storage location metrics, Md5sum file size metrics, memory metrics, process metrics, identity metrics, network metrics, login metrics, packages metrics, and file activity metrics;

performing associating and lookup of application behavioral metrics using minimal compute and memory requirements, using a Temporal Profile Graph (TPG) module in operative communication with the Temporal Application Behavior Metric module, wherein the Temporal Profile Graph module configured to build a graph node relationship using a time-based key to enable quick association of all application behavior metrics to a specific period in time within an enterprise or organization operating environment;

reporting any deviation of behavior, as detected by the Anomaly Detection Engine, as an alert, using an Anomaly Event/Alert module in operative communication with the Anomaly Detection Engine;

performing application behavior profile learning in a Metrics Persistence module by consuming the real-time telemetry from various sources and persisting in a Database (DB);

in an Application Behavioral Metrics Learning Engine (module), reading persisted telemetries within a specified time range, placing the telemetries in the application role context of the workload source, compiling the telemetries in time buckets, using a customized syntactic pattern recognition approach to compile workload telemetries into application behavioral metrics profiles, storing application behavioral metrics profiles in a Temporal Profile Graph (TPG) format, wherein the TPG format is configured to be user readable and editable;

permitting manual definition of temporal application behavioral metrics and editing of learned behavior in a Manual Temporal Profile Graph (MTPG) module, the MTPG module is operatively connected to the Temporal Application Behavioral Metrics module, which stores manually defined temporal application behavioral metrics in the Temporal Profile Graph (TPG) format;

wherein the Temporal Profile Graph (TPG) format permits the TPG to be treated as code, wherein temporal application behavioral metrics is part of an iterative process, where temporal application behavioral metrics can be updated, and wherein the TPG format is part of the QA/test process to check for temporal application behavioral metrics deviation;

taking alerts and merging them to an temporal application behavioral metrics definition in a Merger module as a mechanism for fine tuning the TPG and increasing sensitivity of the alert;

wherein creating Temporal Profile Graph (TPG) uses a Telemetry Database for storing the telemetries, receiving telemetries stored in the Telemetry Database uses the Application Behavioral Metrics Learning Engine, placing telemetry in an application context uses a an application function/module, aggregating the telemetries uses a role function/module for the workload source for an application, grouping the telemetries in time buckets uses a profile type function/module, grouping the telemetries with the schedule on the time bucket uses a schedule function/module, and adding these functions as telemetry attributes to the TPG.

Embodiments described herein are also directed to a zero trust, cloud-to-ground application environment protection platform. The invention applies zero trust principles to protecting the application environment. The invention intelligently defines adaptive security profiles for all applications and workloads based on their runtime behavior—not static rules—and adapts the protection continuously. The invention also monitors and enforces compliance continuously and in real-time, for continuous protection. And, the invention alone unifies application security data across a full range of modern cloud, hybrid, virtualized, containerized and traditional enterprise environments.

The invention provides a cybersecurity platform that analyzes, alerts and responds with high-speed low-latency performance that commercial platforms demand. The invention performs at sub-second speed, high volume, and massive scale for a dynamic enterprise application environment.

The invention is APP-FIRST—it reverses the model by starting from the app perspective. The invention continually consumes and analyzes real-time telemetry with a behavioral analytics engine that is optimized for performance and tuned to how apps operate. With continuous behavioral monitoring, security policy matches app reality, and provides the means to target vulnerabilities, detect anomalies, adapt policy to dynamic operational changes, and respond on-demand.

The invention platform uses an appliance-sensor architecture and deploys as a virtual machine on-premises or in public/hybrid/multi-cloud environments. The invention is configured for scale, high performance, and as an extensible, open platform for integration across security and infrastructure management solutions.

The invention uses a load-balancing, n+1 appliance clustering. The invention provides a multi-tenant platform with role-based management. The invention is REST API-driven and is export-ready to SIEM, SOAR, SAP.

Any of the systems or methods disclosed herein may include a Security Agent with a light footprint to deliver full-stack, application and cloud workload protection. The Security Agent actively monitors and enforces on over 115 parameters, streams and pushes differential data updates on configurable schedules, and alerts in real-time.

Any of the systems or methods disclosed herein may include an agentless security by using live telemetry from agent deployments of well-known EPP/EDR platforms. In this embodiment, the invention provides improved risk posture, protection and compliance within hours or days without the duplicate costs and deployment pain of typical 'app-centric' solutions.

The invention unifies capabilities supporting visibility, control, and response, helping organizations modernize security for their application environments by incorporating zero trust strategies.

The invention's approach to microsegmention is based on a deep, comprehensive understanding of the behavior of application workloads.

Any of the systems or methods disclosed herein may be deployed in on-premises data centers, cloud, hybrid, and containerized environments, as well as in a hosted version of the platform. The invention's approach to microsegmention is based on a deep, comprehensive understanding of the behavior of application workloads. The platform uses machine learning and advanced behavior analytics to assess 160 unique application runtime parameters and build a complete view of applications and workloads across cloud and on-premises environments. These inputs are used to develop an Application Trust Profile for each application and workload, which is continuously updated and used to determine which behaviors should be authorized and which fall outside the baseline and should trigger an alert or be automatically blocked. These recommendations can then be automatically deployed to enforce microsegmentation policies, which are updated in real time based on changes to application behaviors, vulnerabilities, or threat profiles. The result of this approach is more accurate segmentation policies, helping organizations reduce time to value, limit errors and the resulting negative business impacts, and lower ongoing operational costs.

Integration with Cloud-Based Endpoint Protection Platforms

Any of the systems or methods disclosed herein may be combined with third party cloud-based endpoint protection platforms. The invention supports deployment flexibility by allowing organizations to use the lightweight agent or utilize agents of technology partners to take advantage of existing deployments. A partner ecosystem permits expansion through a platform integration with a cloud-based endpoint protection platform, which enables customers to enforce microsegmentation policies managed by the invention, through cloud-based endpoint protection platform agents. Telemetry collected by cloud-based endpoint protection platforms is automatically and continuously fed to the invention platform and used as an additional input into the Application Trust Profile. Customers can then choose to automatically generate microsegmentation policies that are sent back to the cloud-based endpoint protection platform and enforced through the native firewalls on host servers. By enabling organizations to use already deployed agents to support microsegmentation initiatives, the invention can help customers significantly reduce time to value, improve security, and accelerate their journey to the cloud.

Application environments have changed dramatically since the first microsegmentation tools were introduced ten years ago. Environments are more distributed and dynamic than ever, microservices-based architectures are commonplace, and attackers are more motivated than ever before to target these valuable resources. For all these reasons, microsegmentation should be a critical component to every organization's zero trust application security strategy—and yet it remains underutilized. This is not because organizations struggle to see the value microsegmentation can provide, but because many microsegmentation tools do not have the capabilities required to effectively protect modern environments. The invention's intelligent workload segmentation provides a new approach to help organizations improve their application security posture. When coupled with a cloud-based endpoint protection platform, an organization gains flexibility, additional telemetry, and improved time to value.

The term "zero trust", as used herein, refers to a set computer security principles and practices. A non-limiting list of zero trust features includes:

Devices on network-identified and inventoried
Authentication-2FA+
Monitor network for anomalous activity, require 2FA or restrict access for questionable
Match data type and sensitivity to users
Conditional access
Least-privileged access (LPA) model, only use minimum level of access for job
Remote access by application only, not for entire network
Device health & posture pre-check before connection
Segment & secure the cloud network.

Referring now to the figures, the schematics illustrate components for the modeling and expression of Temporal Graph Profiles (TPGs). The present disclosure is illustrated by way of example and not limited in the accompanying figures in which like reference numerals indicate similar elements.

FIG. 1 is a schematic diagram and depicts an illustrative model of how Application behaviors are created and defined in a Temporal Profile Graph. FIG. 1 shows an example having, for a specific Application and Role, TPG metrics including schedule, command, arguments, user, executable, Md5sum, memory, and CPU. FIG. 1 shows changes from a SAT time period to a SUN time period between various monitored components.

Figure 2:
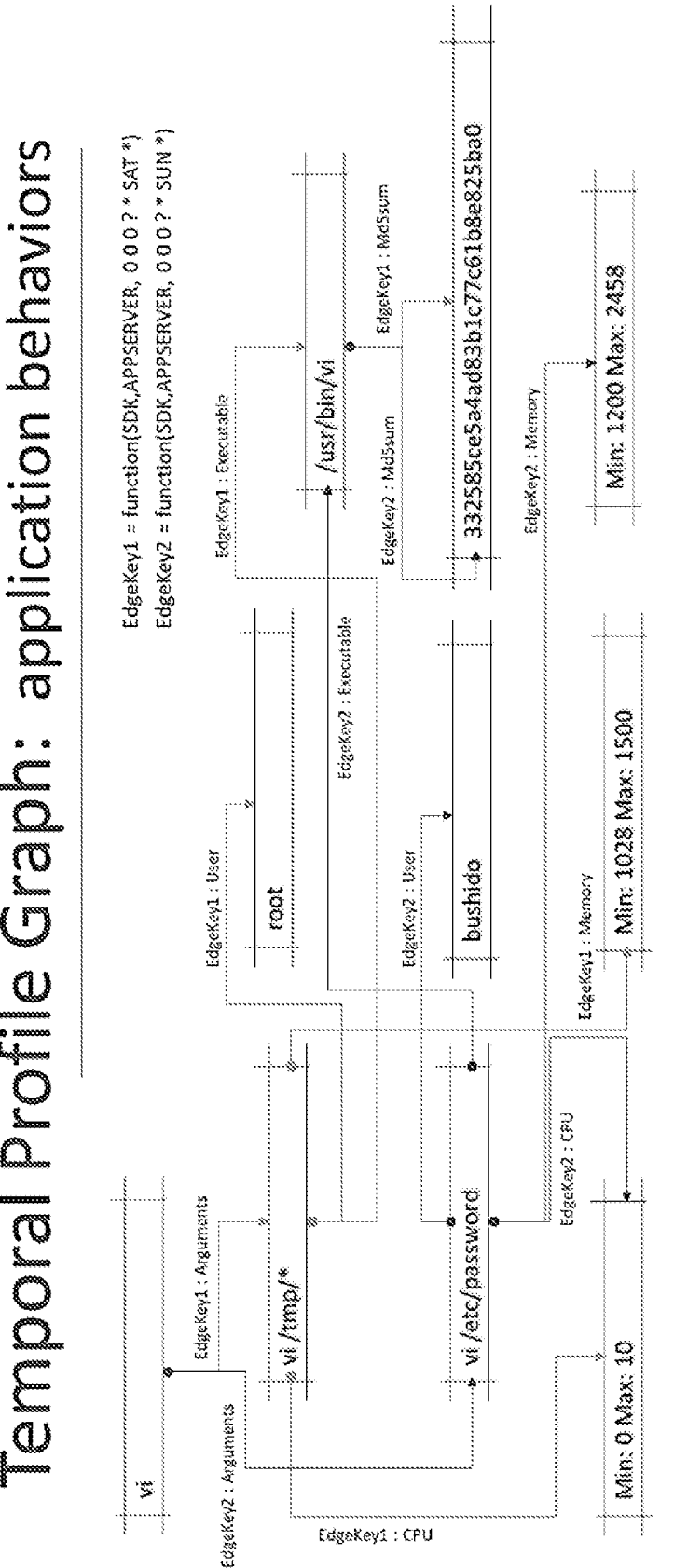
FIG. 2 is a schematic diagram and depicts an illustrative example of application behavior data and dependencies stored in a TPG.

FIG. 2 is a schematic diagram and depicts an illustrative example of application behavior data and dependencies stored in a TPG. FIG. 2 shows application behaviors, for a specific Application and Role, TPG metrics including schedule, command, arguments, user, executable, Md5sum, memory, and CPU. FIG. 2 shows changes from a SAT time period to a SUN time period between various monitored components. FIG. 2 shows the number of nodes over the time span increasing from 10 nodes to 16 nodes.

FIG. 3 is a schematic diagram and depicts the application behavior metrics attributes to be stored in a Temporal Profile Graph. FIG. 3 shows examples of attributes, for a specific Application, e.g SDK, and Role, e.g. AppServer. Specific TPG metrics include schedule, command, arguments, user, executable, Md5sum, memory, and CPU.

The terminology used herein is for the purpose of describing particular embodiments only and is not intended to limit the full scope of the claims. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the singular forms "a", "an" and "the" are intended to include the plural forms as well, unless the context clearly indicates otherwise. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," etc.). Similarly, the terms "comprises" and/or "comprising," when used in this specification, specify the presence of stated features, integers (or fractions thereof), steps, operations, elements, and/or components, but do not preclude the presence or addition of one or more other features, integers (or fractions thereof), steps, operations, elements, components, and/or groups thereof.

As used in this document, the term "comprising" means "including, but not limited to."

As used herein the term "and/or" includes any and all combinations of one or more of the associated listed items. It should be understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All ranges disclosed herein also encompass any and all possible subranges and combinations of subranges thereof unless expressly stated otherwise. Any listed range should be recognized as sufficiently describing and enabling the same range being broken down into at least equal subparts unless expressly stated otherwise. As will be understood by one skilled in the art, a range includes each individual member.

Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Rather, these embodiments are provided so that this disclosure will be thorough and complete, and will fully convey the scope of the inventive concepts to those skilled in the art. Like numbers refer to like elements throughout.

Any of the systems and methods disclosed herein may include a network connecting a computing device configured with a security agent to a security cloud server that provides configuration, analysis, and correcting to the computing device through the security agent. A computing device may include components such as processors, network interfaces, memory, an operating system, processes, and log files.

Any of the systems and methods disclosed herein may include wherein devices of the security cloud server also include processors, network interfaces, memory, a communications module, an analysis module, a configuration module, a corrective module to halt or deceive malware executing on the computing device, an alert module to notify other computing devices or users of the malware detected on the computing device, and an administrative user interface (UI) to enable an administrator associated with the security cloud server to view notifications of observed events and make decisions regarding appropriate responses to those events.

Any of the systems and methods disclosed herein may include wherein the cloud security server is a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices including distributed nodes and virtual machines.

Any of the systems or methods disclosed herein may include a machine in the example form of computer system, within which a set of instructions for causing the machine to perform any one or more of the methodologies, processes or functions discussed herein may be executed. In some examples, the machine is a mobile device in communication with a server, a desktop computer in communication with a cloud server, a device or devices in a peer-to-peer network, an IoT device, a device with cloud-based hosted applications, or a virtual device. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein.

Example computer system may include processor, memory, data storage and communication interface, which may communicate with each other via data and control bus. In some examples, computer system also includes display and/or user interface.

Processor may include, without being limited to, a microprocessor, a central processing unit, an application specific integrated circuit (ASIC), a field programmable gate array (FPGA), a digital signal processor (DSP) and/or a network processor. Any of the systems and methods disclosed herein may include a processor(s) including a central processing unit (CPU) or a graphic processing unit (GPU). Processor may be configured to execute processing logic for performing the operations described herein. In general, processor may include any suitable special-purpose processing device specially programmed with processing logic to perform the operations described herein.

Memory may include, for example, without being limited to, at least one of a read-only memory (ROM), a random access memory (RAM), a flash memory, a dynamic RAM (DRAM) and a static RAM (SRAM), storing computer-readable instructions executable by processing device. In general, memory may include any suitable non-transitory computer readable storage medium storing computer-readable instructions executable by processing device for performing the operations described herein. In some examples, computer system may include two or more memory devices (e.g., dynamic memory and static memory).

Computer system may include communication interface device, for direct communication with other computers (including wired and/or wireless communication), and/or for communication with network. In some examples, computer system may include display device (e.g., a liquid crystal display (LCD), a touch sensitive display, etc.). In some examples, computer system may include user interface (e.g., touchscreen, keyboard, an alphanumeric input device, a cursor control device, etc.).

In some examples, computer system may include data storage device storing instructions (e.g., software) for performing any one or more of the functions described herein. Data storage device may include any suitable non-transitory computer-readable storage medium, including, without being limited to, solid-state memories, optical media and magnetic media.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, Software applications or code) include machine instructions for a programmable processor, and may be implemented in a high-level procedural and/or object-oriented programming language, and/or in assembly/machine language.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. To provide for interaction with a user, the systems and techniques described here may be implemented on a computer having a display device for displaying information to the user and a U.I. touchscreen, stylus pencil, voice command, keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or frontend components.

Any of the systems and methods disclosed herein may include a network, such as wired networks, wireless networks, and combinations of wired and wireless networks. Further, the network may include any one or combination of multiple different types of public or private networks (e.g., cable networks, the Internet, wireless networks, etc.). The components of the system may be interconnected by any form or medium of digital data communication (e.g., a communication network). Examples of communication networks include a local area network ("LAN"), a wide area network ("WAN"), and the Internet. The computing system may include clients and servers. A client and server are generally remote from each other and typically interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the invention.

Many modifications and variations can be made without departing from its spirit and scope, as will be apparent to those skilled in the art. Functionally equivalent methods and systems within the scope of the disclosure, in addition to those enumerated herein, will be apparent to those skilled in the art from the foregoing descriptions. Such modifications, variations, and Equivalents are intended to fall within the scope of the appended claims. The present disclosure is to be limited only by the terms of the appended claims, along with the full scope of equivalents to which such claims are entitled. It is to be understood that this disclosure is not limited to particular methods and systems, which can, of course, vary. It is also to be understood that the terminology used herein is for the purpose of describing particular embodiments only, and is not intended to be limiting.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations.

The embodiments described herein can include various combinations and/or sub-combinations of the functions, components, and/or features of the different embodiments described. Various of the above-disclosed and other features and functions, or alternatives thereof, may be combined into many other different systems or applications.

Various presently unforeseen or unanticipated alternatives, modifications, variations, or improvements therein may be subsequently made by those skilled in the art, each of which is also intended to be encompassed by the disclosed embodiments.

The invention claimed is:

1. A method of a security platform having programming instructions executable on a processor configured to effect, by the security platform in operative communication with one or more client computer networks, the method comprises the steps:

comparing real-time telemetry with a learned or defined application profile in an Anomaly Detection Engine (module), wherein the real-time telemetry is a streaming data feed of application behavioral metrics from native agents, cloud workloads, third party agents, and agentless telemetry;

evaluating multiple application behavioral metrics expressed in application interactions and application state, on a temporal basis, using a Temporal Application Behavior Metric module in operative communication with the Anomaly Detection Engine, wherein said application behavioral metrics are evaluated individually or in combination with other metrics, wherein at least some of the application behavioral metrics include: metrics expressed based on an association with an application profile or common entity, CPU metrics, User name metrics, password metrics, application root metrics, file storage location metrics, Md5sum file size metrics, memory metrics, process metrics, identity metrics, network metrics, login metrics, packages metrics, and file activity metrics;

performing associating and lookup of the application behavioral metrics using minimal compute and memory requirements, using a Temporal Profile Graph (TPG) module in operative communication with the Temporal Application Behavior Metric module, wherein the Temporal Profile Graph module configured to build a graph node relationship using a time-based key to enable quick association of all application behavior metrics to a specific period in time within an enterprise or organization operating environment;

reporting any deviation of behavior, as detected by the Anomaly Detection Engine, as an alert, using an Anomaly Event/Alert module in operative communication with the Anomaly Detection Engine;

performing application behavior profile learning in a Metrics Persistence module by consuming the real-time telemetry from various sources and persisting in a Database (DB);

in an Application Behavioral Metrics Learning Engine (module), reading persisted telemetries within a specified time range, placing the telemetries in an application role context of a workload source, compiling the telemetries in time buckets, using a customized syntactic pattern recognition approach to compile workload telemetries into application behavioral metrics profiles, storing application behavioral metrics profiles in a TPG format, wherein the TPG format is configured to be user readable and editable;

permitting manual definition of temporal application behavioral metrics and editing of learned behavior in a Manual Temporal Profile Graph (MTPG) module, the MTPG module is operatively connected to the Temporal Application Behavioral Metrics module, which stores manually defined temporal application behavioral metrics in the TPG format;

wherein the TPG format permits the TPG to be treated as code, wherein temporal application behavioral metrics is part of an iterative process, where temporal application behavioral metrics can be updated, and wherein the TPG format is part of a QA/test process to check for temporal application behavioral metrics deviation;

taking alerts and merging the alerts to an temporal application behavioral metrics definition in a Merger module as a mechanism for fine tuning the TPG and increasing sensitivity of the alert;

wherein creating TPG uses a Telemetry Database for storing the telemetries, receiving telemetries stored in the Telemetry Database uses the Application Behavioral Metrics Learning Engine, placing telemetry in an application context uses an application function/module, aggregating the telemetries uses a role function/module for the workload source for an application, grouping the telemetries in time buckets uses a profile type function/module, grouping the telemetries with the schedule on the time bucket uses a schedule function/module, and adding these functions as telemetry attributes to the TPG.

* * * * *